US008098746B2

(12) United States Patent
Kim et al.

(10) Patent No.: US 8,098,746 B2
(45) Date of Patent: Jan. 17, 2012

(54) APPARATUS AND METHOD FOR TRANSMITTING/RECEIVING DATA IN A CLOSED-LOOP MULTI-ANTENNA SYSTEM

(75) Inventors: Sung-Jin Kim, Suwon-si (KR); Ho-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 645 days.

(21) Appl. No.: 11/763,019

(22) Filed: Jun. 14, 2007

(65) Prior Publication Data

US 2008/0075196 A1 Mar. 27, 2008

(30) Foreign Application Priority Data

Jun. 14, 2006 (KR) .................. 10-2006-0053628

(51) Int. Cl.
*H04L 27/28* (2006.01)
(52) U.S. Cl. ........ 375/260; 375/267; 375/299; 375/346; 375/347; 375/348; 375/349
(58) Field of Classification Search .................. 375/260, 375/299, 267, 346, 347, 348, 349; 370/203, 370/204, 205, 206, 208, 209, 210; 455/59
See application file for complete search history.

(56) References Cited

U.S. PATENT DOCUMENTS

| 5,852,630 | A | * | 12/1998 | Langberg et al. ............. 375/219 |
| 7,437,182 | B2 | | 10/2008 | Lee et al. |
| 7,505,529 | B2 | * | 3/2009 | Kwak et al. .................... 375/295 |
| 7,636,573 | B2 | * | 12/2009 | Walton et al. ................. 455/454 |
| 2004/0146024 | A1 | * | 7/2004 | Li et al. ......................... 370/334 |
| 2005/0032521 | A1 | | 2/2005 | Lee et al. |
| 2005/0043031 | A1 | | 2/2005 | Cho et al. |
| 2006/0030364 | A1 | * | 2/2006 | Olesen et al. .............. 455/562.1 |
| 2006/0146755 | A1 | * | 7/2006 | Pan et al. ...................... 370/334 |
| 2006/0245513 | A1 | * | 11/2006 | Koo et al. ..................... 375/267 |
| 2007/0010957 | A1 | * | 1/2007 | Sampath et al. ................ 702/57 |
| 2008/0013610 | A1 | * | 1/2008 | Varadarajan et al. ......... 375/221 |
| 2008/0108310 | A1 | * | 5/2008 | Tong et al. ...................... 455/69 |
| 2009/0175366 | A1 | * | 7/2009 | Maltsev et al. ............... 375/260 |

FOREIGN PATENT DOCUMENTS

| KR | 10-2005-0015730 | 2/2005 |
| KR | 10-2005-0081040 | 8/2005 |
| KR | 10-2006-0005681 | 1/2006 |

* cited by examiner

*Primary Examiner* — Dhaval Patel
(74) *Attorney, Agent, or Firm* — NSIP Law

(57) ABSTRACT

An apparatus and method for transmitting/receiving data in a closed-loop multi-antenna system. A receiver receives a plurality of data streams from a plurality of transmit antennas of a transmitter, generates Channel Quality Information (CQIs) of channels that carry data streams transmitted from at least two transmit antenna allocated to the receiver among the plurality of transmit antennas, and transmits the CQIs to the transmitter. For the CQI generation, the receiver generates a channel matrix through channel estimation of the received data streams, generates a reception beamforming matrix from the channel matrix including only components of the data streams transmitted from the allocated transmit antennas, and calculates the CQIs using the channel matrix, the reception beamforming matrix, and a total signal-to-noise ratio (SNR) obtained through the channel estimation.

20 Claims, 3 Drawing Sheets

APPARATUS AND METHOD FOR TRANSMITTING/RECEIVING DATA IN A CLOSED-LOOP MULTI-ANTENNA SYSTEM

CROSS-REFERENCE TO RELATED APPLICATION

This application claims the benefit of Korean Patent Application No. 2006-53628, filed in the Korean Intellectual Property Office on Jun. 14, 2006, the disclosure of which is incorporated herein by reference.

BACKGROUND OF THE INVENTION

1. Field of the Invention

Aspects of the present invention generally relate to a closed-loop multi-antenna system. More particularly, aspects of the present invention relate to an apparatus and method for transmitting/receiving data under a multi-user environment in a closed-loop multi-antenna system.

2. Description of the Related Art

Unlike wired channels, wireless channels have low transmission reliability due to multipath interference, shadowing, propagation attenuation, time-variant noise, interference, etc. Low transmission reliability is a main reason for failing to increase data rate in mobile communications.

To overcome the problem, many techniques have been proposed. Major examples of these techniques are error control coding and diversity. Error control coding mitigates the effects of signal distortion and noise. Diversity copes with fading by receiving a plurality of signals experiencing different fading.

Diversity schemes are categorized into time diversity, frequency diversity, multipath diversity, and spatial diversity. For time diversity, channel coding is combined with interleaving. For frequency diversity, signals transmitted at different frequencies are received in different multiple paths. Multipath diversity is a scheme that achieves a diversity effect by separating multipath signals using different fading information. A spatial diversity effect is achieved through independent fading signals using a plurality of antennas in a transmitter, a receiver, or both. An antenna array is generally used for spatial diversity.

A system using an antenna array (a multi-antenna system) has multiple antennas at a transmitter/receiver and exploits space to increase frequency efficiency. The spatial utilization facilitates an increase in data rate under the confines of time and frequency.

The multi-antenna system is also called a Multiple-Input Multiple-Output (MIMO) system in that the system transmits independent information through the respective antennas. The MIMO system requires an efficient signal processing algorithm to provide a high-quality, high-speed data service.

One such signal processing algorithm is a resource allocation algorithm. The resource allocation algorithm aims to allocate resources, such as data rates, to different antennas so as to achieve a target error rate with minimal resource consumption. The resource allocation algorithm can be considered as separate signal processing algorithms for a transmitter and a receiver. Given a data rate for each antenna, the transmitter seeks to allocate resources to the antennas with minimal energy consumption, aiming for the target error rate.

Conventionally, resource allocation is classified into uniform allocation, fixed allocation, and full-search allocation. The uniform allocation scheme allocates the same data rate to the antennas. This is the simplest resource allocation method without feedback. However, despite Successive Interference Cancellation (SIC), let alone linear detection, the uniform allocation scheme does not perform well because of a high error rate.

In the fixed allocation scheme, an optimal resource allocation is decided for one channel and is applied commonly to all channels. The optimal resource allocation is based on statistical analysis. Therefore, if the analysis holds true, the fixed allocation scheme performs better than the uniform allocation scheme. However, the constraint of fixed allocation limits error rate performance and makes the fixed allocation scheme ineffective against channel changes.

The full-search allocation scheme uses all possible combinations as data rate candidates and allocates a candidate requiring the least power to a current channel. The exhaustive search results in the best performance but increases complexity and the amount of feedback information. In this context, an iterative algorithm has been proposed for full-search allocation in order to decrease complexity.

The signal processing algorithm of the receiver is about assessing the status of each transmission channel and feeds the assessed channel information back to the transmitter, whereas the signal processing algorithm of the transmitter is about allocating resources to transmit antennas based on the feedback from the receiver.

A major signal processing algorithm for the transmitter is Bell Labs Layered Space Time (BLAST). BLAST increases the amount of transmitted data without expanding a frequency area used in the system by use of multiple antennas. Diagonal-BLAST (D-BLAST) and Vertical-BLAST (V-BLAST) algorithms are used. D-BLAST organizes data blocks along diagonals in space and time by using a particular block coding for data to be transmitted through respective transmit antennas. Despite the benefit of high frequency efficiency, D-BLAST suffers from implementation complexity. V-BLAST, on the other hand, reduces complexity by transmitting independent data through each antenna.

Signal processing algorithms for the receiver rely on linear detection or non-linear detection to detect signals transmitted from transmit antennas using a received signal. Linear detection techniques include Zero Forcing (ZF) and Minimum Mean Square Error (MMSE). In the ZF technique, the receiver calculates the norms of the column vectors of a channel matrix, detects a symbol corresponding to a column vector with the largest norm, and eliminates the detected signal component from a received signal, thereby canceling interference between symbols. The MMSE technique minimizes the mean squared errors between original transmitted symbols and signals estimated by the receiver.

Non-linear detection techniques include Maximum Likelihood (ML) detection and SIC. The ML detection technique can improve performance significantly by selecting a signal having a minimum squared Euclidean distance to a received signal from among all possible symbols that can be transmitted from all transmit antennas. However, complexity increases exponentially with the number of transmit antennas and a modulation order. Although the ML detection technique performs best, it requires a large amount of computation, thus increasing implementation complexity.

SIC is an interference cancellation technique that detects a channel with a large Signal-to-interference plus Noise Ratio (SINR) first of all and eliminates the channel in order to improve performance. SIC additionally requires ordering to achieve the best performance.

As described above, there exists a need for a signal detection scheme and a resource allocation scheme that enables more accurate detection of a transmitted signal from a received signal and is advantageous in terms of computation volume in order to improve performance in a MIMO system.

SUMMARY OF THE INVENTION

Aspects of the present invention address the above and/or other problems and/or disadvantages and to provide at least the advantages described below. Accordingly, aspects of the present invention provide a receiving apparatus and method for generating feedback information so as to allow joint detection only for a desired data stream in a closed-loop multi-user MIMO system.

Another aspect of the present invention provides a method for generating a reception beam vector so as to allow joint detection only for a desired data stream from a channel matrix resulting from channel estimation in a receiver.

A further aspect of the present invention is to provide a transmitting apparatus and method for performing Adaptive Modulation and Coding (AMC) on a user stream-by-user stream basis according to the channel status information of a channel that will deliver a data stream to each receiver, which is fed back from the receiver.

According to an aspect of the present invention, a method of receiving data at a receiver in a closed-loop multi-antenna system is provided. The method comprises receiving a plurality of data streams from a plurality of transmit antennas of a transmitter; generating CQIs of channels that carry data streams transmitted from at least two transmit antenna allocated to the receiver from the plurality of transmit antennas; and transmitting the CQIs to the transmitter. The generation of the CQIs comprises generating a channel matrix through channel estimation of the received data streams, generating a reception beamforming matrix from the channel matrix including only components of the data streams transmitted from the allocated transmit antennas, and calculating the CQIs using the channel matrix, the reception beamforming matrix, and a total signal-to-noise ration (SNR) obtained through the channel estimation.

According to another aspect of the present invention, a receiver in a closed-loop multi-antenna system is provided. The receiver comprises a channel estimator to receive a plurality of data streams from a plurality of respective transmit antennas of a transmitter and to generate a channel matrix through channel estimation of the received data streams; a reception beamforming matrix generator to generate a reception beamforming matrix from the channel matrix including only components of data streams transmitted from at least two transmit antennas allocated to the receiver from the plurality of the transmit antennas; and a CQI generator to calculate Channel Quality Information (CQIs) of channels that carry the data streams transmitted from the at least two transmit antenna allocated to the receiver using the channel matrix, the reception beamforming matrix, and a total SNR obtained through the channel estimation, and to transmit the CQIs to the transmitter.

According to another aspect of the present invention, a method of transmitting data from a transmitter in a closed-loop multi-antenna system is provided. The method comprises allocating at least two transmit antennas from a plurality of transmit antennas to a receiver; transmitting data streams to the receiver through the at least two transmit antennas; receiving CQIs of channels that have carried the data streams transmitted from the at least two transmit antennas from the receiver; and allocating a transmit antenna to the receiver according to the CQIs.

According to another aspect of the present invention, a transmitter in a closed-loop multi-antenna system is provided. The transmitter comprises a plurality of transmit antennas, a user selector to allocate at least two transmit antennas from the plurality of transmit antennas to a receiver; an encoder/modulator to encode and modulate data streams to be transmitted to the receiver and to output the coded and modulated data streams to the at least two transmit antennas, and a controller to receive, from the receiver, CQIs of channels that have carried the data streams transmitted from the at least two transmit antennas and to control the user selector and the encoder and modulator according to the CQIs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
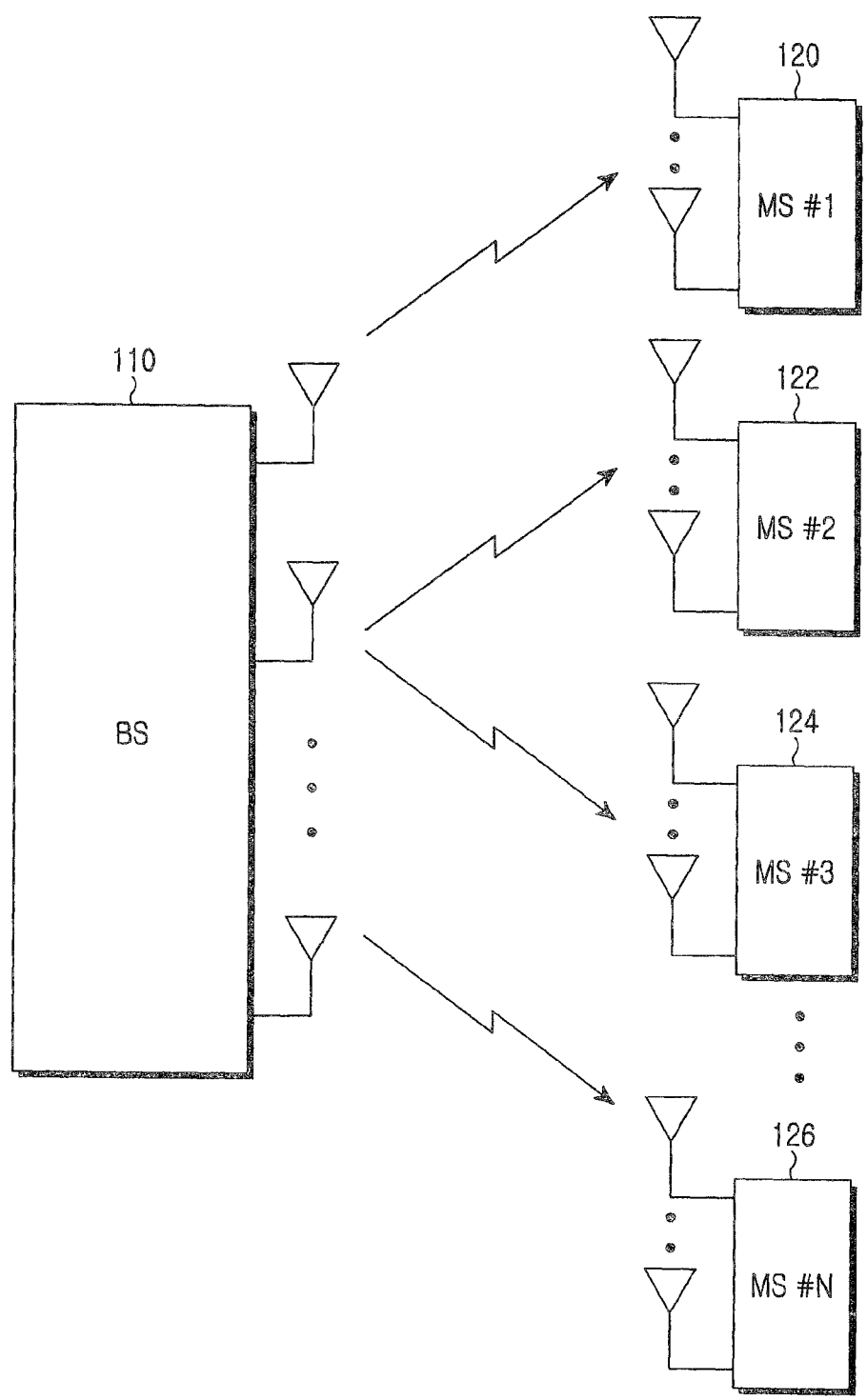
FIG. 1 is a block diagram of a MIMO system supporting multiple users, to which embodiments of the present invention are applied.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Before making a detailed description of embodiments of the present invention, an outline of a decoding algorithm proposed by aspects of the present invention will be presented. In a MIMO system supporting multiple users, a signal received at a receiver is modeled as Equation (1):

$$y=Hx+n \quad (1)$$

where y denotes a received signal matrix, H denotes a channel matrix, x denotes a transmitted signal matrix, and n denotes Additive White Gaussian Noise (AWGN). Equation (1) can be expressed as $$\begin{bmatrix} y_1 \\ y_2 \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & \vdots & \vdots & \vdots \\ h_{N_R 1} & h_{N_R 2} & \ldots & h_{N_R N_T} \end{bmatrix} \begin{bmatrix} s_1 \\ s_2 \\ \vdots \\ s_{N_T} \end{bmatrix} + \text{noise} \quad (2)$$

where $N_T$ denotes the total number of transmit antennas in a transmitter, $N_R$ denotes the number of receive antennas in the receiver, and $h_{i,j}$ denotes an antenna channel vector representing channel characteristics between a $j^{th}$ transmit antenna and an $i^{th}$ receive antenna.

First, the received signal is beamformed by $$z=Wy \quad (3)$$

where W denotes an $N \times N_R$ reception beamforming matrix (N is the number of transmit antennas allocated to the receiver among the entire transmit antennas). The reception beamforming matrix W is defined as $$W = \begin{bmatrix} w_1^T \\ w_{21}^T \\ \vdots \\ w_N^T \end{bmatrix} \quad (4)$$

The reception beamforming matrix W is designed such that the receiver can receive signals transmitted from transmit antennas allocated to the receiver. Hence, the reception beamforming matrix W includes as many vectors as the number of the allocated transmit antennas, i.e., N vectors.

An element $w_i$ of the reception beamforming matrix W is an $N \times 1$ vector that nullifies other streams not directed to the receiver, computed by $$w_i = h_{A(i)}^H \left( \sum_{j \in A^c} h_j h_j^H + \frac{N_T}{SNR} I \right) h_{A(i)} \quad (5)$$

where SNR represents Signal-to-Noise Ratio, A denotes a set of the i of the transmit antennas allocated to the receiver ($A=\{A(1), A(2), \ldots, A(N)\}$), $A(i)$ denotes the index of an $i^{th}$ allocated antenna, and $A^c$ denotes the complementary set of the set A, i.e., a set of the indices of the transmit antennas not allocated to the receiver. Thus, $A \cup A^c = \{1, 2, \ldots, N_T\}$ and $A \cap A^c = \emptyset$. The channel matrix H described in Equation (1) is a $N_R \times N_T$ matrix given as $$H = [h_1 \ldots h_{N_T}] \quad (6)$$

where $h_i$ denotes an $N_R \times 1$ antenna channel vector.

The receiver detects transmitted signals $[x_{(1)}, x_{(2)}, \ldots, x_{(N)}]^T$ by joint decoding of an $N \times 1$ vector $z=[z_1, z_2, \ldots, z_N]^T$ with elements corresponding to streams transmitted from the allocated transmit antennas. $x_{(i)}$ denotes an $i^{th}$ symbol allocated to the receiver in a transmitted signal vector x.

The receiver calculates the Channel Quality Information (CQIs) of the allocated transmit antennas using H, W, and SNR by $$\rho_i = \frac{|w_i^h h_i|^2}{\sum_{j \neq i} |w_i^h h_i|^2 + \frac{N_T}{SNR}} \quad (7)$$

The CQIs are fed back to a Base Station (BS).

FIG. 1 is a block diagram of a MIMO system supporting multiple users, to which embodiments of the present invention are applied. A BS 110 has at least two transmit antennas. The BS 110 allocates transmit antennas to each user and transmits data streams to the user through the allocated transmit antennas. At least one transmit antenna is allocated to each user. When needed, all transmit antennas can be allocated to one user without allocating any transmit antennas to the other users. The BS 110 allocates a data stream to each user based on channel status information received from the user and selects a coding rate and a modulation scheme for the data stream according to the channel status information.

MSs 120, 122, 124, and 126 receive data streams from the BS 110, generate channel status information about channels corresponding to transmit antennas allocated to them, and feed back the channel status information to the BS 110. The MSs 120, 122, 124, and 126 may be any device capable of receiving signals from a transmitter, such as a portable computer, mobile phone, personal digital assistant, personal entertainment device, or the like.

Figure 2:
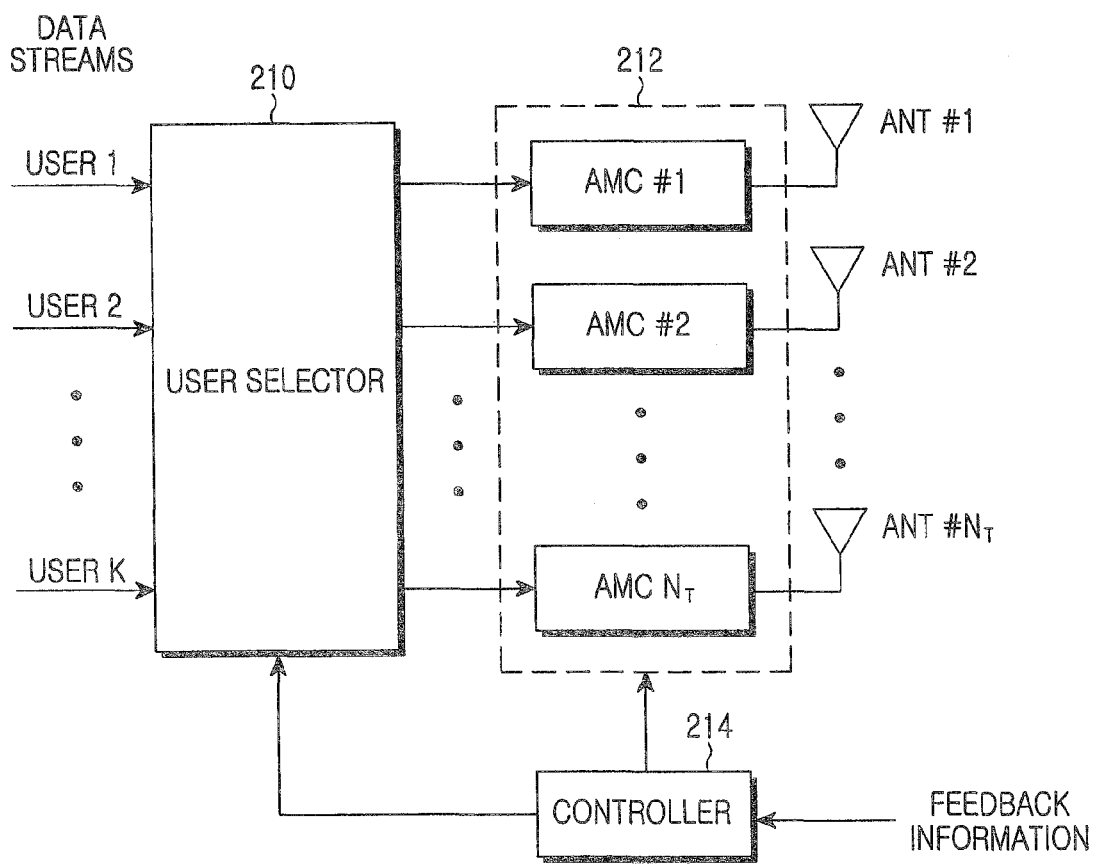
FIG. 2 is a block diagram of a transmitter in a closed-loop MIMO system according to an embodiment of the present invention.

FIG. 2 is a block diagram of a transmitter in a closed-loop MIMO system according to an embodiment of the present invention. A user selector 210 receives data streams directed to users and selects users for respective transmit antennas, that is, allocates the data streams to the respective transmit antennas under the control of a controller 214. The user selector 210 allocates a data stream for a user to at least one transmit antenna, none of the transmit antennas, or all the transmit antennas under the control of the controller 214. After the user allocation, the user selector 210 transmits the data streams to Adaptive Modulator and Coders (AMCs) 212 mapped to the transmit antennas to which the data streams are allocated.

The AMCs 212 encode the received data streams at predetermined coding rates and modulate the coded streams in predetermined modulation schemes. The coding rates and the modulation schemes are selected under the control of the controller 214. The AMCs 212 are mapped to the transmit antennas in a one-to-one correspondence and can operate independently for their mapped transmit antennas. The coded and modulated data streams from the AMCs 212 are transmitted through the transmit antennas mapped to the AMCs 212.

As described above, a data stream transmitted from each transmit antenna is received at a destination receiver. The receiver estimates the channel status using the received data stream and feeds back the estimated channel status information to the transmitter. The channel status is estimated based on the SNR of the data stream and represented as CQI.

The controller 214 receives CQIs from receivers. As mentioned earlier, the CQIs are reported for the respective channels that have delivered the data streams. The controller 214 controls the user selector 210 and the AMC 212 based on the CQIs of the respective channels. For example, the controller 214 controls the user selector 210 so as to maximize transmission efficiency under a current channel environment and controls the coding rates and modulation schemes of the AMCs 212 mapped to the transmit antennas according to the statuses of the channels.

Figure 3:
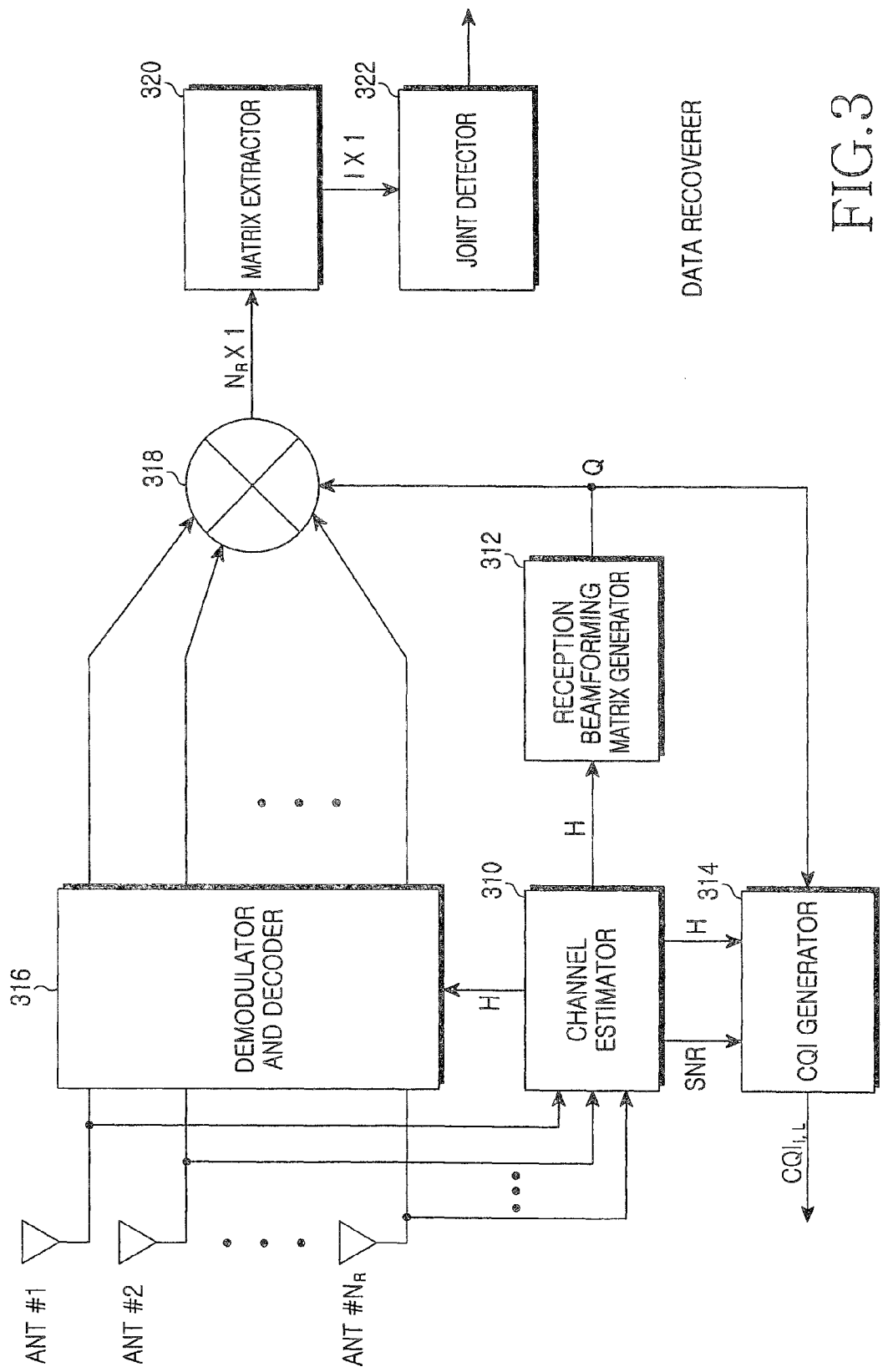
FIG. 3 is a block diagram of a receiver in the closed-loop MIMO system according to an embodiment of the present invention.

FIG. 3 is a block diagram of a receiver in the closed-loop MIMO system according to an embodiment of the present invention. A signal received through at least one receive antenna is provided to a channel estimator 310. The received signal is given as Equation (1).

The channel estimator 310 performs channel estimation on the received signal and acquires the resulting channel matrix H. The channel estimator 310 also computes the total SNR of the received signal as the ratio of a signal strength obtained from a transmitted signal and channel characteristics to a signal obtained from AWGN. The channel estimator 310 provides the channel matrix H to a demodulator and decoder 316, a reception beamforming matrix generator 312, and a CQI generator 314. The channel estimator 310 also provides the total SNR to the CQI generator 314.

The reception beamforming matrix generator 312 generates a reception beamforming matrix Q using the channel matrix H. To describe the generation of the reception beamforming matrix Q in more detail, both sides of Equation (1) are multiplied by $H^H$ as follows in Equation 8:

$$H^H y = H^H H x + H^H n \quad (8)$$

Then Q is multiplied by both sides of Equation (8). Thus, as seen in Equation (9), $$QH^H y = QH^H H x + QH^H n \quad (9)$$
$$= Rx + QH^H n$$

where Q is the reception beamforming matrix. According to Equation (9), $R=QH^H H$ and thus $Q^H R = H^H H$. If $H^H H$ is defined as T, QT=R. For a MIMO system with four transmit antennas and four receive antennas, the equation QT=R takes the following form, Equation (10):

$$\begin{bmatrix} q_{11} \\ q_{12} \\ q_{21} \\ q_{22} \end{bmatrix} \begin{bmatrix} t_{11} & t_{12} & t_{13} & t_{14} \\ t_{21} & t_{22} & t_{23} & t_{24} \\ t_{31} & t_{32} & t_{33} & t_{34} \\ t_{41} & t_{42} & t_{43} & t_{44} \end{bmatrix} = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix} \quad (10)$$

where $q_{i,l}$ denotes a reception beam vector by which an $i^{th}$ user receives an $l^{th}$ data stream.

Aspects of the present invention are at least partially based on the premise that the receiver generates only the CQI of a data stream directed to the receiver. Therefore, R should have components related to channels that deliver data streams directed to the receiver, without the other components.

For example, if desired streams are transmitted through first and second transmit antennas, R is given by Matrix (11):

$$\begin{bmatrix} r_{11} & r_{12} & 0 & 0 \\ 0 & r_{22} & 0 & 0 \\ r_{31} & r_{32} & r_{33} & r_{34} \\ r_{41} & r_{42} & r_{43} & r_{44} \end{bmatrix} \quad (11)$$

Design of Q is useful to make R the matrix (11). As Equation (10) reveals, R is determined by Q and T and as T has already been estimated, only Q determines R.

The reception beamforming matrix generator 312 generates the reception beamforming matrix Q referring to the channel matrix H. The generation of Q is possible because the receiver has knowledge of the channel matrix H and a data stream to receive.

A condition for generating the reception beamforming matrix Q can be generalized as Equation (12):

$$q_{i,l}^H \cdot h_{j,m} = 0$$

for all $i \neq j$ $l \leftarrow L,$ $m \leftarrow M,$ $L \cup M = \{1, 2, \ldots, N_T\}$ $L \cap M = 0 \quad (12)$ where $q_{i,l}^H$ denotes a reception beam vector by which an $i^{th}$ user receives an $l^{th}$ data stream, and $h_{j,m}$ denotes a channel vector corresponding to an $m^{th}$ data stream that a $j^{th}$ user intends to receive. As defined in Equation (12), i is not identical to j. The $l^{th}$ data stream is one of several data streams transmitted from at least two transmit antennas allocated to the receiver and is different from the $m^{th}$ data stream.

The ZF (zero forcing) technique can be additionally used in generating the reception beamforming matrix. In this case, the reception beamforming matrix generator 312 eliminates r under the diagonal of the matrix R by ZF. After the ZF, a desired reception beamforming matrix Q is created by applying the condition defined as Equation (12) to the matrix R.

The CQI generator 314 receives the reception beamforming matrix Q from the reception beamforming matrix generator 312 and the total SNR and the channel matrix H from the channel estimator 310. The CQI generator generates the CQIs of the channels that carry the data streams destined for the receiver according to the total SNR and the matrices H and Q. The CQI generation is generalized to $$CQI_{i,l} = \frac{|q_{i,l}^T h_{i,l}|^2}{\sum_{j=i} \sum_{m \in M} |q_{i,l}^T h_{j,m}|^2 + \frac{1}{SNR}} \quad (13)$$

where $CQI_{i,l}$ denotes the CQI of a channel that has carried an $l^{th}$ data stream received by the $i^{th}$ user, $q_{i,l}^H$ denotes the reception beam vector by which the $i^{th}$ user receives the $l^{th}$ data stream, $h_{j,m}$ denotes the channel vector corresponding to the $m^{th}$ data stream that the $j^{th}$ user intends to receive, and SNR denotes the total SNR. If R is given as the matrix (11), the CQI generator 314 generates $CQI_{11}$ and $CQI_{12}$ as channel status information by Equation (13). These CQIs are fed back to the transmitter.

For data recovery, the signal received through the at least one receive antenna is provided to the demodulator and decoder 316. The demodulator and decoder 316 processes the received signal using the channel matrix H according to Equation (8). This processing can be carried out on the basis of a data stream received through each receive antenna.

A multiplier 318 multiplies the reception beamforming matrix Q by the processed signal, thus outputting the resulting product in the form described as Equation (9). A matrix extractor 320 extracts a matrix with only intended signal components from the matrix received from the multiplier 318. A joint detector 322 recovers the intended data streams by joint detection of the extracted matrix.

In accordance with aspects of the present invention as described above, a receiver measures the channel quality of channels that carry data streams destined for the receiver and reports the channel quality measurements to a transmitter in a closed-loop multi-antenna system. For this purpose, the receiver generates a reception beamforming matrix so as to generate only the CQIs of the channels that carry the data streams destined for the receiver. Therefore, the amount of feedback information as well as the amount of computation required to generate the CQIs is reduced.

Further, the receiver extracts the data streams destined for the receiver and applies joint detection to the extracted data streams during data recovery. Therefore, the volume of computation required for data recovery is reduced.

Transmission quality management techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of receiving data at a receiver in a closed-loop multi-antenna system, comprising:
   receiving a plurality of data streams from a plurality of transmit antennas of a transmitter;
   generating Channel Quality Informations (CQIs) of channels that carry data streams transmitted from at least two transmit antennas allocated to the receiver from the plurality of transmit antennas; and
   transmitting the CQIs to the transmitter,
   wherein the generating of the CQIs comprises:
      generating a channel matrix through channel estimation of the received data streams,
      generating a reception beamforming matrix from the channel matrix including only components of the data streams transmitted from the allocated transmit antennas,
      and calculating the CQIs using the channel matrix, the reception beamforming matrix, and a total Signal-to-Noise Ratio (SNR) of the received data streams obtained through the channel estimation.

2. The method of claim 1, wherein the generating of the reception beamforming matrix comprises generating the reception beamforming matrix using zero forcing.

3. The method of claim 1, wherein the generating of the reception beamforming matrix comprises generating the reception beamforming matrix by $\underline{q}_{i,l}^{H} \cdot \underline{h}_{j,m} = 0$,
   wherein:
      $\underline{q}_{i,l}^{H}$ denotes a reception beam vector by which an $i^{th}$ user receives an $l^{th}$ data stream,
      $\underline{h}_{j,m}$ denotes a channel vector corresponding to an $m^{th}$ data stream that a $j^{th}$ user intends to receive,
      i is not identical to j, and
      the $l^{th}$ data stream is one of the data streams transmitted from the at least two transmit antennas allocated to the receiver and is different from the $m^{th}$ data stream.

4. The method of claim 3, wherein the calculating of the CQI comprises calculating the CQIs by $$CQI_{i,l} = \frac{|\underline{q}_{i,l}^{T} \underline{h}_{i,l}|^2}{\sum_{j=i} \sum_{m \in M} |\underline{q}_{i,l}^{T} \underline{h}_{j,m}|^2 + \frac{1}{SNR}};$$

wherein:
   $CQI_{i,l}$ denotes the CQI of a channel that has carried the $l^{th}$ data stream received by the $i^{th}$ user,
   $\underline{q}_{i,l}^{H}$ denotes the reception beam vector by which the $i^{th}$ user receives the $l^{th}$ data stream,
   $\underline{h}_{j,m}$ denotes the channel vector corresponding to the $m^{th}$ data stream that the $j^{th}$ user intends to receive, and
   SNR denotes the total SNR.

5. The method of claim 1, further comprising:
   extracting the data streams transmitted from the at least two transmit antennas allocated to the receiver from the plurality of data streams; and
   decoding the extracted data streams by joint detection.

6. A receiver in a closed-loop multi-antenna system, the receiver comprising:
   a channel estimator configured to:
      receive a plurality of data streams from a plurality of respective transmit antennas of a transmitter; and
      generate a channel matrix through channel estimation of the received data streams;
   a reception beamforming matrix generator configured to generate a reception beamforming matrix from the channel matrix including only components of data streams transmitted from at least two transmit antennas allocated to the receiver from the plurality of the transmit antennas; and
   a Channel Quality Informations (CQI) generator configured to:
      calculate CQIs of channels that carry the data streams transmitted from the at least two transmit antennas allocated to the receiver using the channel matrix, the reception beamforming matrix, and a total Signal-to-Noise Ratio (SNR) of the received data streams obtained through the channel estimation; and
      transmit the CQIs to the transmitter.

7. The receiver of claim 6, wherein the reception beamforming matrix generator is further configured to generate the reception beamforming matrix using zero forcing.

8. The receiver of claim 6, wherein the reception beamforming matrix generator is further configured to generate the reception beamforming matrix by $\underline{q}_{i,l}^{H} \cdot \underline{h}_{j,m} = 0$,
   wherein:
      $\underline{q}_{i,l}^{H}$ denotes a reception beam vector by which an user receives an $l^{th}$ data stream,
      $\underline{h}_{j,m}$ denotes a channel vector corresponding to an $m^{th}$ data stream that a $j^{th}$ user intends to receive,
      i is not identical to j, and
      the $l^{th}$ data stream is one of the data streams transmitted from the at least two transmit antennas allocated to the receiver and is different from the $m^{th}$ data stream.

9. The receiver of claim 8, wherein the CQI generator calculates the CQIs by $$CQI_{i,l} = \frac{|\underline{q}_{i,l}^{T} \underline{h}_{i,l}|^2}{\sum_{j=i} \sum_{m \in M} |\underline{q}_{i,l}^{T} \underline{h}_{j,m}|^2 + \frac{1}{SNR}},$$

wherein:

$CQI_{i,l}$ denotes the CQI of a channel that has carried the $l^{th}$ data stream received by the $i^{th}$ user, $\underline{q}_{i,l}^{H}$ denotes the reception beam vector by which the $i^{th}$ user receives the $l^{th}$ data stream, $\underline{h}_{j,m}$ denotes the channel vector corresponding to the $m^{th}$ data stream that the $j^{th}$ user intends to receive, and SNR denotes the total SNR.

10. The receiver of claim 6, further comprising a data recoverer configured to:
   extract the data streams transmitted from the at least two transmit antennas allocated to the receiver from the plurality of data streams; and
   decode the extracted data streams by joint detection.

11. The receiver of claim 10, wherein the receiver further comprises:
   a demodulator/decoder configured to process the plurality of data streams based on the channel matrix; and
   a multiplier configured to multiply the reception beamforming matrix by the processed plurality of data streams;
   wherein the data recoverer comprises:
      a matrix extractor configured to extract, from the result of the multiplier, a matrix having only signal components intended for the receiver; and
      a joint detector configured to recover data streams intended for the receiver based on the extracted matrix.

12. A method of transmitting data from a transmitter in a closed-loop multi-antenna system, the method comprising:
   allocating at least two transmit antennas from a plurality of transmit antennas to a receiver;
   transmitting data streams to the receiver through the at least two transmit antennas;
   receiving Channel Quality Informations (CQIs) of channels that have carried the data streams transmitted from the at least two transmit antennas from the receiver; and
   allocating a transmit antenna to the receiver according to the CQIs,
   wherein the CQIs are generated using:
      a channel matrix resulting from channel estimation of the received data streams,
      a reception beamforming matrix generated from the channel matrix including only components of the data streams transmitted from the allocated transmit antennas, and
      a total Signal-to-Noise Ratio (SNR) of the received data streams obtained through the channel estimation.

13. A transmitter in a closed-loop multi-antenna system, the transmitter comprising:
   a plurality of transmit antennas;
   a user selector configured to allocate at least two transmit antennas from the plurality of transmit antennas to a receiver;
   an encoder/modulator configured to:
      encode and modulate data streams to be transmitted to the receiver; and
      output the coded and modulated data streams to the at least two transmit antennas; and
   a controller configured to:
      receive, from the receiver, Channel Quality Informations (CQIs) of channels that have carried the data streams transmitted from the at least two transmit antennas; and
      control the user selector and the encoder and modulator according to the CQIs,
   wherein the CQIs are generated using:
      a channel matrix resulting from channel estimation of the received data streams,
      a reception beamforming matrix generated from the channel matrix including only components of the data streams transmitted from the allocated transmit antennas, and
      a total Signal-to-Noise Ratio (SNR) of the received data streams obtained through the channel estimation.

14. The transmitter of claim 13, wherein:
   the encoder/modulator comprises a plurality of encoder/modulators, each corresponding to one of the plurality of transmit antennas; and
   each of the plurality of encoder/modulators encodes and modulates data streams to be transmitted by the corresponding transmit antenna.

15. A system, comprising:
   a receiver configured to receive a plurality of data streams and to calculate Channel Quality Informations (CQIs) of received channels based on components of the data streams transmitted from transmit antennas allocated to the receiver; and
   a transmitter configured to:
      transmit the plurality of data streams to the receiver via a plurality of transmit antennas;
      receive the CQIs from the receiver; and
      allocate at least one of the plurality of transmit antennas to the receiver based on the CQIs,
   wherein the receiver comprises:
      a channel estimator configured to:
         receive the plurality of data streams; and
         generate a channel matrix through channel estimation of the data streams;
      a reception beamforming matrix generator configured to generate a reception beamforming matrix based on the channel matrix, including only the components of the data streams transmitted from the transmit antennas allocated to the receiver; and
      a CQI generator configured to:
         calculate the CQIs of the received channels based on the channel matrix, the reception beamforming matrix, and a total signal-to-noise ratio of the received data streams obtained through the channel estimation of the channel estimator; and
         transmit the CQIs to the transmitter.

16. The system of claim 15, wherein the transmitter comprises:
   a plurality of transmit antennas;
   a user selector configured to allocate at least two transmit antennas among the plurality of transmit antennas to the receiver; and
   a controller configured to:
      receive the CQIs from the receiver; and
      control the user selector based on the CQIs.

17. The system of claim 16, wherein the transmitter further comprises:
   a encoder/modulator configured to:
      encode and modulate the plurality of data streams; and
      output the coded and modulated plurality of data streams to the at least two transmit antennas;
   wherein the controller is further configured to control the encoder/modulator based on the CQIs received from the receiver.

18. The system of claim 15, further comprising a plurality of receivers, each receiver configured to only calculate CQIs of channels of data streams transmitted to the receiver.

19. A non-transitory computer readable medium comprising instructions that, when executed by a receiver, cause the receiver to perform a method comprising:
generating Channel Quality Informations (CQIs) only of channels that carry data streams transmitted to the receiver from at least two antennas; and
transmitting the CQIs to a transmitter having the at least two antennas,
wherein the CQIs are generated using:
a channel matrix resulting from channel estimation of the received data streams;
a reception beamforming matrix generated from the channel matrix including only components of the data streams transmitted from the allocated transmit antennas; and
a total Signal-to-Noise Ratio (SNR) of the received data streams obtained through the channel estimation.

20. The non-transitory computer readable medium of claim 19, wherein the generating of the CQIs comprises calculating the CQIs using the channel matrix generated through channel estimation of the received data streams, the reception beamforming matrix generated from the channel matrix including only components of the data streams transmitted from the at least two antennas, and the SNR obtained through the channel estimation.

* * * * *